United States Patent [19]
Maki et al.

[11] Patent Number: 5,479,433
[45] Date of Patent: Dec. 26, 1995

[54] DIRECT CURRENT ARC FURNACE

[75] Inventors: Toshimichi Maki, Tokyo; Hiroyuki Yamashita, Kurashiki; Yoshimi Kawazu, Kurashiki; Hidefumi Nakashima, Kurashiki, all of Japan

[73] Assignees: NKK Corporation; Tokyo Steel M.F.G. Co., Ltd., both of Tokyo, Japan

[21] Appl. No.: 162,344

[22] Filed: Dec. 3, 1993

[30] Foreign Application Priority Data

Dec. 7, 1992 [JP] Japan .................................. 4-326859

[51] Int. Cl.⁶ .................................................. H05B 7/02
[52] U.S. Cl. .................................................. 373/72; 373/108
[58] Field of Search .............................. 373/71, 72, 88, 373/108

[56] References Cited

U.S. PATENT DOCUMENTS

| | | | |
|---|---|---|---|
| 1,433,404 | 10/1922 | Harris | 373/72 |
| 4,435,812 | 3/1984 | Guido | 373/72 |
| 4,730,337 | 3/1988 | Schubert | 373/72 |
| 5,142,650 | 8/1992 | Kida et al. | 373/88 |
| 5,233,625 | 8/1993 | Hofmann et al. | 373/94 |
| 5,268,924 | 12/1993 | Sakakibara et al. | 373/72 |

FOREIGN PATENT DOCUMENTS

| | | |
|---|---|---|
| 2-126094 | 5/1990 | Japan . |
| 3-50489 | 3/1991 | Japan . |
| 3-84386 | 4/1991 | Japan . |

*Primary Examiner*—Tu Hoang
*Attorney, Agent, or Firm*—Frishauf, Holtz, Goodman, Langer & Chick

[57] ABSTRACT

A DC arc furnace according to the invention has a bottom electrode, which comprises a plurality of contact pins each having an end to be brought into contact with an object and to supply arc-forming current thereto, a current base electrically connected to the other end of each of the contact pins for distributing current from a power supply to the contact pins, and a cooling device for cooling the current base with the use of cooling water.

15 Claims, 4 Drawing Sheets

DIRECT CURRENT ARC FURNACE

BACKGROUND OF THE INVENTION

1. Field of the Invention

This invention relates to a direct current (DC) arc furnace for performing arc-melting of scraps and Sub materials.

2. Description of the Related Art

In general, DC arc furnaces are superior to three-phase (alternate current (AC)) arc furnaces in the following points:

Having a single cathode electrode, they have a small electrode unit requirement;

Only small noise occurs at the time of melting;

Since arc vertically extends from the single cathode electrode to the bottom electrode, a uniform temperature distribution can be obtained, thereby preventing occurrence of a hot spot; and Since induction loss is prevented, energy can be used efficiently.

Therefore, DC arc furnaces have recently been more popular than three-phase arc furnaces.

FIG. 1 shows a conventional DC arc furnace. As is shown in the figure, the DC arc furnace 1 has a bottom electrode provided at a bottom portion to be used as an anode, and a graphite electrode 9 provided at an upper portion to be used as a cathode. At the time of operation, scraps and sub materials are put into the furnace, and then DC arc is created between contact pins 7 provided in the bottom and the upper electrode 9, to apply arc heat energy to the scraps so as to melt them. The contact pins 7 are contained in an iron wall case filled with a stumping member 8, and only upper portions of the pins 7 are exposed to the interior of the furnace.

The contact pins 7 are connected to a current board 5, which has its lower surface portion connected to terminals 3 and 4. The terminal 3 is connected to a cable 2, and supplied with power through the cable 2. The power is distributed to each of the contact pins 7.

The terminal 4 is a hollow member, and has an inner passage 4a with an upper opening. The inner passage 4a communicates with the air supply source of an air conditioner. Further, the upper opening of the passage 4a faces the lower surface of a base plate 6 located above the passage 4, for blowing air onto base plates 5 and 6 and the contact pins 7 so as to forcibly cool them.

Air-cooling aims to protect the base plates 5 and 6 and the contact pins 7 from the heat conducted therethrough and the Joule heat created at the contact pins 7, and to maximize the heat conductivity of the furnace bottom, thereby reducing the maintenance cost of the bottom electrode.

Here, note that the amount of heat to be removed from the base plates is determined by a product of the temperature difference between a coolant and a cooled member, the contact area therebetween, and the heat transmission coefficient. The temperature difference is the difference between the allowable temperature of a cooled member and the temperature of a coolant, and hence does not greatly depend on the kind of the coolant. The contact area is hard to increase in light of limitations in structure. The heat transmission coefficient depends on the thermal conductivity and the flow rate of the coolant.

In the case of using air as a coolant, the upper limit of the heat transmission coefficient is actually about 100 kcal/m².h.deg. The arrangement of the contact pins 7 and the passage of cooling air are important elements for keeping the air flow around each contact pin at high level.

As is shown in FIG. 2, in the conventional DC arc furnace, the contact pins 7 are arranged in a spiral manner about the air injection passage 4a. This arrangement restrains variations in the cross section of the cooled air passage, thereby minimizing the range of variations in air flow so as to increase the cooling effect of the base plates 5 and 6 and the contact pins 7.

Recently, there is a tendency of increasing the number of contact pins of the bottom electrode in order to increase the capacity of the furnace. A large number of contact pins can prevent current concentration, which may damage a particular portion of each contact pin or cause leakage of molten steel out of the furnace.

In the above-described conventional DC arc furnace, however, the layout of the contact pins is limited and hence the number of the pins cannot greatly be increased, since they must be arranged in consideration of the flow of cooled air, as is explained before. This is a significant drawback in increasing the furnace capacity.

SUMMARY OF THE INVENTION

It is the object of the invention to provide a DC arc furnace capable of increasing the number of contact pins and hence the capacity, without reducing the cooling effect of the bottom electrode.

The inventors studied the relationship between the cooling system of the current base plate and the arrangement of the contact pins. As a result, they found that the number of the contact pins which can be installed is limited in the conventional case wherein an air-cooling system is employed; and that the conductivity of each pin can be improved by arranging the contact pins in rows and columns, thereby preventing local conduction. In light of the above knowledge, they studied the employment of a water-cooling system for cooling the current base plate, which had not been employed in the conventional DC arc furnace having a plurality of contact pins because the furnace would be exploded if molten steel should leak therefrom. They found that arranging the contact pins in rows and columns improves the conductivity of each pin, thereby preventing leakage of molten steel. Thus, this arrangement of contact pins enables the employment of a water-cooling system, which has much higher cooling ability than an air-cooling system.

According to the invention, there is provided a DC arc furnace for melting an object with the use of the heat of arc generated between a bottom electrode and an upper electrode, the bottom electrode comprising:

- a plurality of contact pins each having an end to be brought into contact with the object and to supply arc-forming current thereto;
- a current base plate electrically connected to the other end of each of the contact pins for distributing current from a power source to the contact pins; and
- cooling means for sufficiently cooling the current base plate.
- Preferably, the current base plate has a thickness of 90 mm or more to have a large thermal capacity, so as to reliably prevent leakage of molten steel and thus enhance the safety of the furnace.

More preferably, temperature sensors connected to an alarming system are provided on the bottom of the furnace, for monitoring leakage of molten steel.

Since in the above DC arc furnace, the cooling means directly cools the current base plate, the Joule heat generated at the contact pins and the heat transferred from the molten steel can sufficiently be removed. In particular, since the cooling means is of a water-cooling type, it is not necessary to provide an air passage, which is employed in the conventional air-cooling type furnace. This can relax the conditions in the arrangement of the contact pins, and hence significantly increases the degree of freedom in designing the furnace bottom electrode.

Further, increase of the cooling ability distributes to an increase in the life of a refractory provided on a bottom portion of the furnace, thereby reducing the running cost.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

A DC arc furnace according to an embodiment of the invention will be explained with reference to the accompanied drawings.

Figure 1:
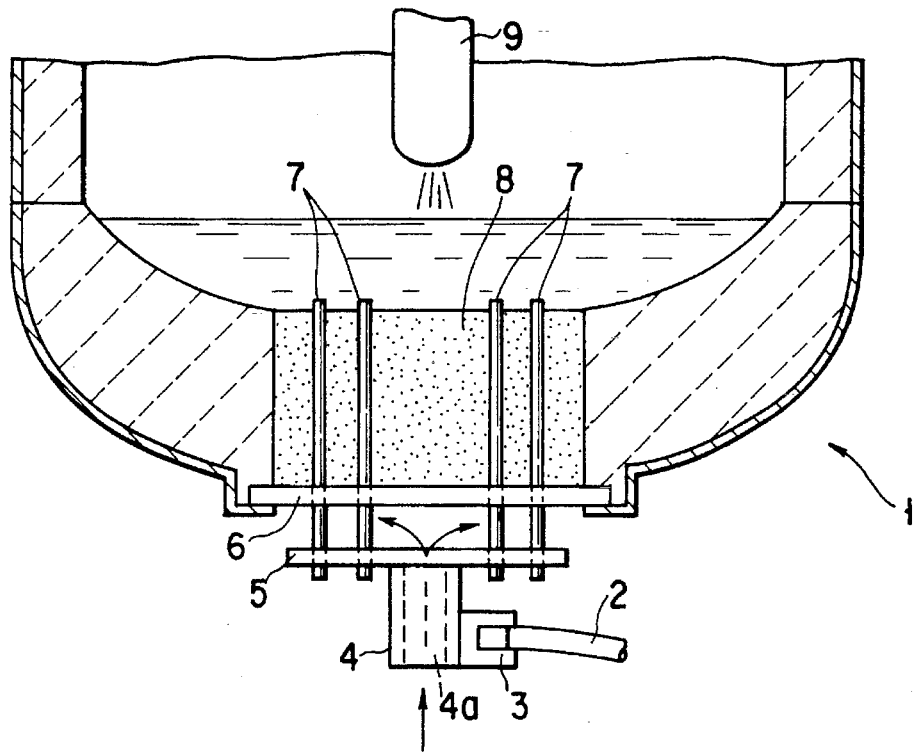
FIG. 1 is a longitudinal sectional view, showing a bottom portion of a conventional DC arc furnace.
Figure 2:
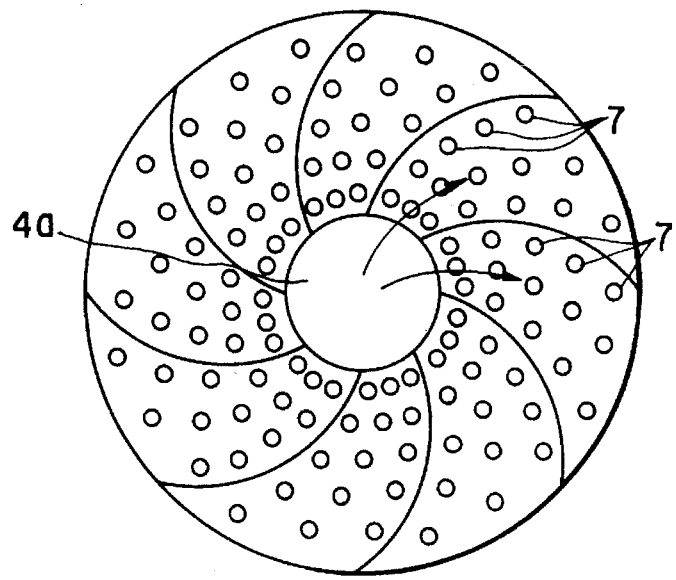
FIG. 2 is a plan view, showing the bottom portion of the conventional DC arc furnace of FIG. 1.
Figure 3:
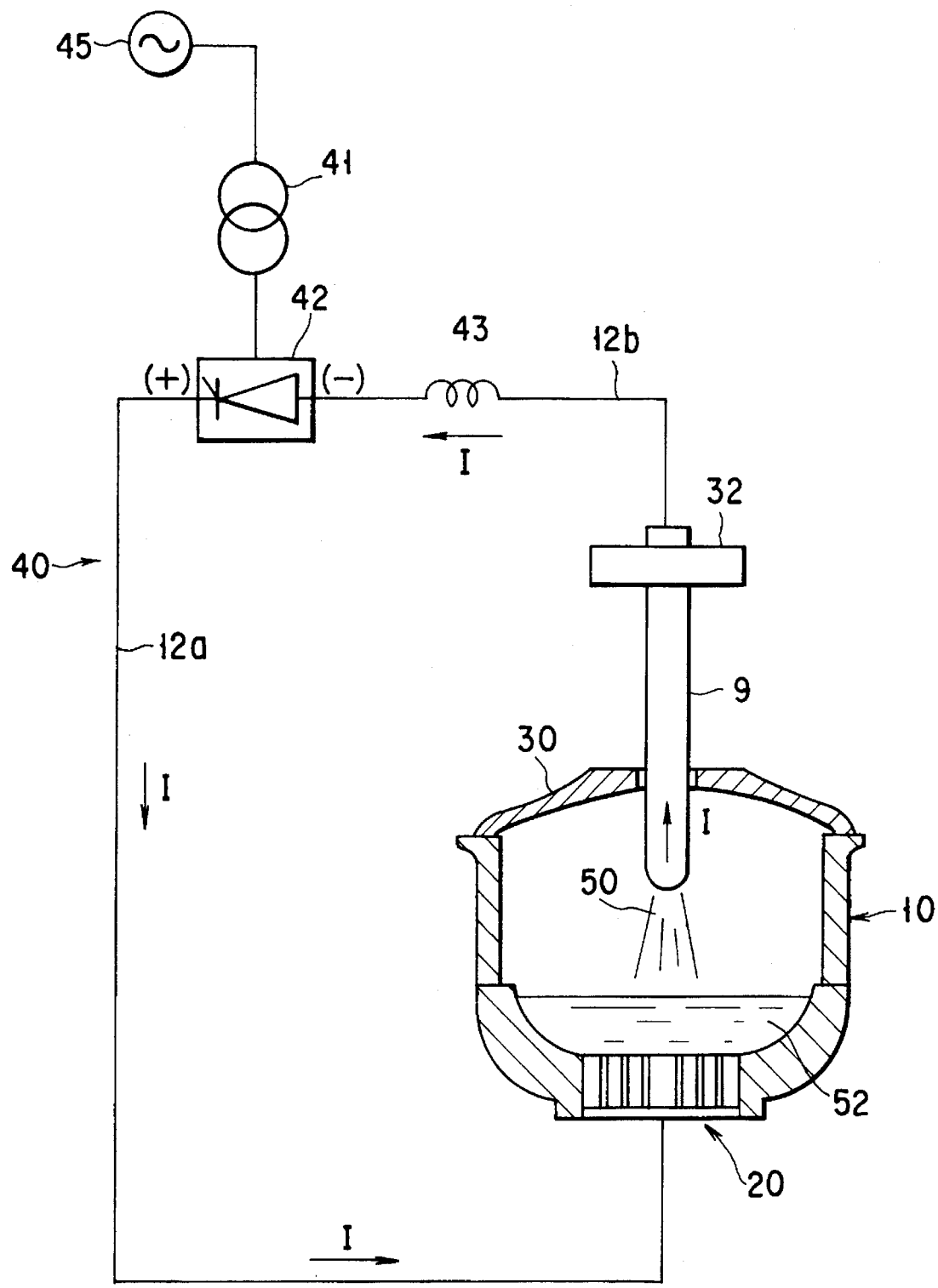
FIG. 3 is a diagram, showing the overall DC arc furnace according to an embodiment of the invention.

As is shown in FIG. 3, a cover 30 covers a DC arc furnace 10, and a furnace bottom electrode 20 is formed in a bottom central portion of the furnace 10. An upper electrode 9 is inserted in a hole formed in the cover 30, and has a tip portion which faces an upper portion of the bottom electrode 20. The upper electrode 9 is formed of a graphite bar, and has a diameter of about 760 mm and a length of about 9000 mm. The upper end of the electrode 9 is held by a holder arm 32, which is secured to an elevating unit (not shown).

The capacity of the DC arc furnace 10 is 200 tons, and the bottom portion of the furnace has an area of about 40 m$^2$.

Then, an arc generating circuit 40 will be explained.

The arc generating circuit 40 connects the upper electrode 9 to the bottom electrode 20. When the circuit 40 is supplied with power, objects to be melted (scraps and sub materials) in the furnace are supplied with power via the bottom electrode 20, and thereby generating arc 50 between the objects and the upper electrode 9. As a result, the objects are transformed into molten steel 52 by the heat of the arc 50. A power supply 45 for the circuit 40 is controlled by a controller (not shown) backed-up by a process computer (not shown).

The circuit 40 comprises the upper electrode 9, a transformer 41, a thyristor converter 42, a DC reactor 43, the power supply 45, and the bottom electrode 20. These elements are connected to one another by means of cables 12a and 12b. A commercial AC power source is used as the power supply 45. The upper electrode 9 is connected to the cathode side of the thyristor converter 42 by means of the cable 12b. The bottom electrode 20 is connected to the anode side of the thyristor converter 42 by means of the cable 12a. The DC reactor 43 is interposed between the cathode side of the thyristor converter 42 and the upper electrode 9. The transformer 41 is interposed between the power supply 45 and the thyristor converter 42.

Figure 4:
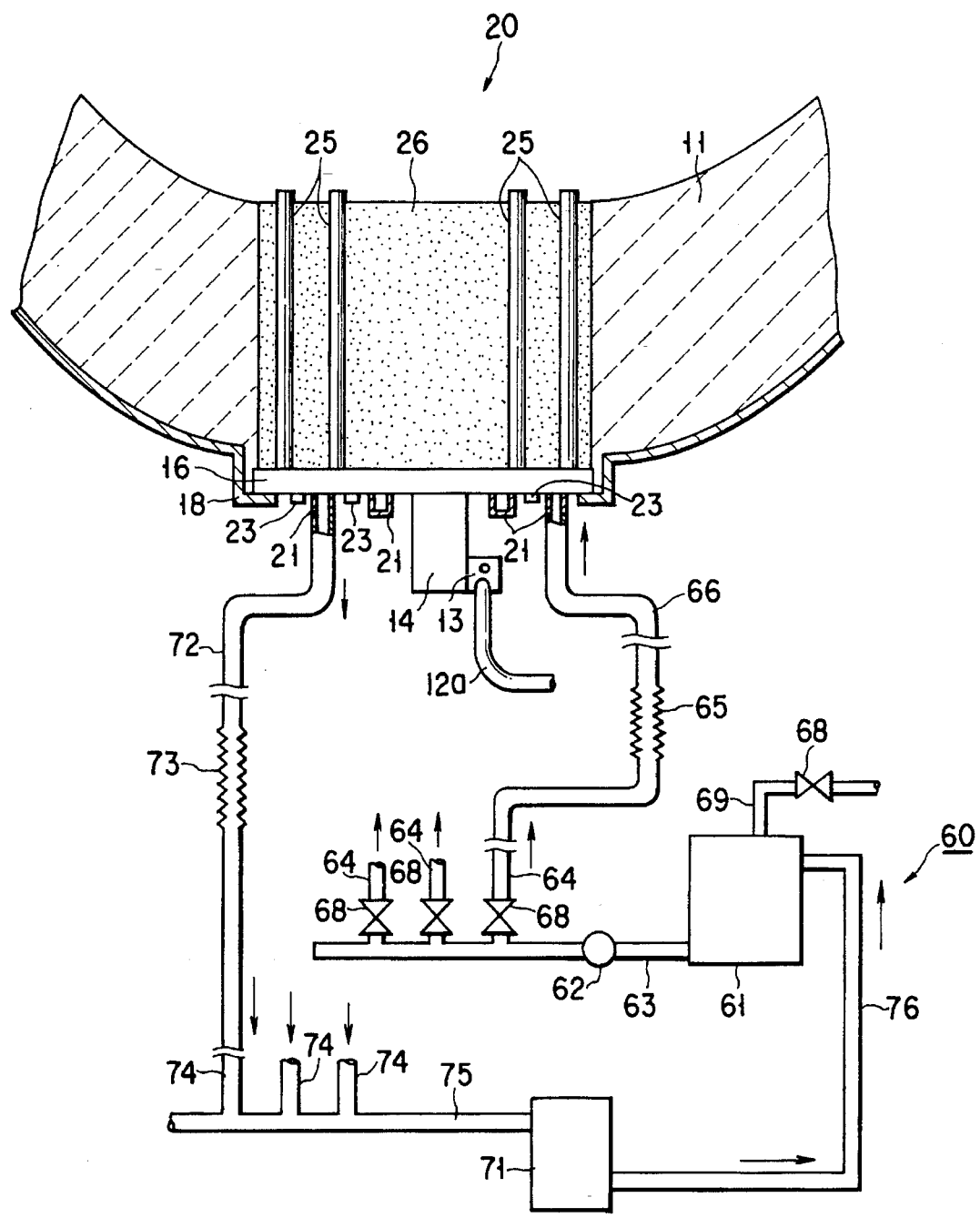
FIG. 4 is a longitudinal sectional view, showing a bottom portion of a DC arc furnace according to an embodiment of the invention.

As is shown in FIG. 4, the bottom electrode 20 is unitized, and covered with bricks (not shown) provided at a predetermined portion of the refractory lining 11 of the furnace. A joint member (not shown) consisting of a magnesia castable member is filled between a bottom electrode case (not shown) and the bricks. The electrically conductive portion of the bottom electrode 20 comprises many contact pins 25, a current base 16, and terminals 13 and 14.

The current base 16 is connected to the anode side of the thyristor converter 42 via the cable 12a and the terminals 13 and 14, and is placed substantially parallel with the bottom electrode unit 20. The terminal 14 is formed of a solid cylindrical steel member. Although the terminal 14 may be formed of a hollow cylindrical member, a solid one is preferable, since the solid one can supply power to the current base plate 16 in a stable manner.

The current base 16 is held by the iron wall of the furnace main body by means of a bracket 18. The current base 16 and the bracket 18 are insulated from each other by the use of an insulating member (not shown). The current base 16 is formed of a steel plate with a thickness of 90 mm or more.

Figure 5:
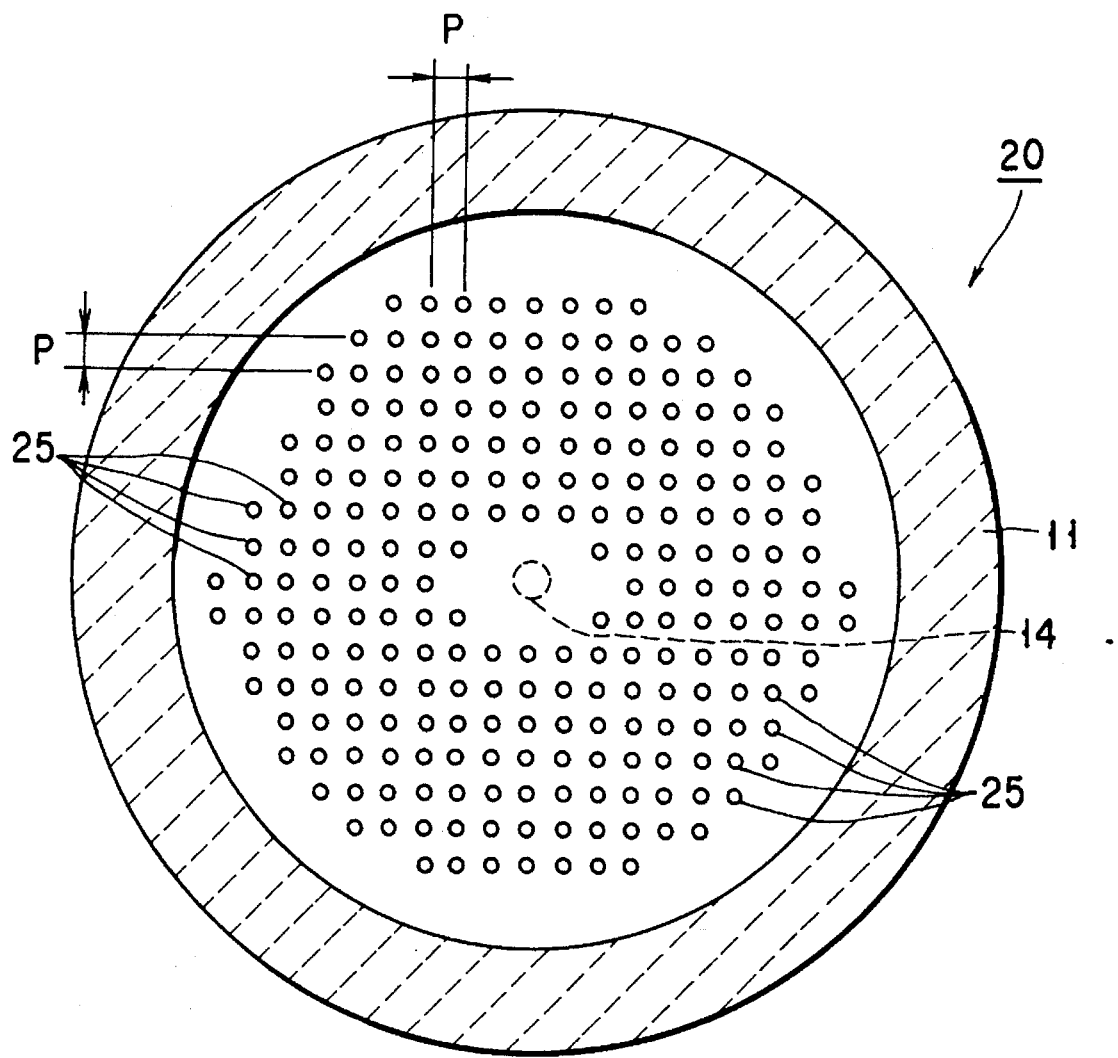
FIG. 5 is a plan view, showing the bottom portion of the conventional DC arc furnace of FIG. 4.

As is shown in FIG. 5, the bottom electrode 20 has the contact pins 25 arranged with a regular pitch. Although 233 contact pins 25 are shown in FIG. 5, 500 contact pins can be provided at maximum. It is advantageous and preferable in light of design to provide 200–300 pins 25. In the case of FIG. 5, the pitch P is 110 mm. Preferably, the pitch P falls within a range of 80–140 mm.

As is shown in the figure, the contact pins 25 are secured to the base 16 such that they are arranged in rows and columns in the vertical direction. The upper end of each of the contact pins 25 are exposed to the inside of the furnace. The spaces between the pins 25 are filled with a refractory member 26. The refractory member 26 is made of magnesia carbon. Each of the contact pins 25 is made of a mild steel, and has a diameter of 46 mm (it is desirable that the diameter falls within the range of 36–50 mm), and a length of 1300 mm.

As is shown in FIG. 4, a water-cooled tube 21 made of copper is attached on the lower surface of the current base 16, and extends in a zigzag manner. The tube 21 has opposite ends communicating with a coolant supply source 61 and a tube line, respectively, which are employed in a cooling device 60. The cooling device 60 is used to cool not only the current base 16 but also other elements employed in the electric furnace 10. One side of the water-cooled tube 21 communicates with a tube line (63-66) with a supply pump 62. The other side of the tube 21 communicates with a tube line (72-76) with a cooling tower 71. The tubes 65 and 73 are formed of a flexible member. Each branch tube 64 has a valve 68.

A plurality of temperature sensors 23 are attached to the lower surface of the current base 16, and are connected to the input portion of a process computer and also to an alarming system.

Then, an explanation will be given of a method for melting scraps in a DC arc furnace with the above-described bottom electrode, and producing a predetermined molten steel.

First, a predetermined amount of scraps and sub materials are put into the furnace, and power is supplied to the bottom electrode 20 and the graphite electrode 9. Arc is created between the graphite electrode 9 and the scraps, thereby generating arc heat and melting the scraps. The furnace temperature increases up to 1550°–1600° C.

At this time, the DC current flows through the cable 12, the terminals 13 and 14, and the current base 16, and is distributed into the scraps through the contact pins 25. Then, the current flows into the upper electrode 9 as a result of discharged arc.

Although being heated by the Joule heat generated at the contact pins 25 and the heat transferred from the molten steel, the current base plate 16 is cooled by water supplied in the water-cooled tube 21, with the result that the lower surface of the base 16 is kept at about 60° C. At this time, the temperature sensors 23 sense the temperature of the lower surface of the base 16, thereby enabling the melting conditions to be monitored at all times. If the temperature of the base plate increases as a result of occurrence of an abnormality in the furnace, the sensors sense the abnormality and an alarm is generated. Thus, the molten steel can be prevented from leaking from the furnace.

Further, the current base 16 is formed thick and has a large heat capacity. This enables a large number of contact pins 25 to be sufficiently cooled, and hence a large furnace can be made. Moreover, the contact pins can be arranged in various manners. In addition, the contact pins can be prevented from being greatly melted or broken, resulting in an increase in the life of the bottom electrode.

The advantages of the DC arc furnace of the invention will be summarized.

Since in the DC arc furnace of the invention, the current base plate is directly cooled by cooling means, the Joule heat generated at the contact pins 25 and the heat transferred from the molten steel can be removed sufficiently. In particular, employing a water-cooling system as the cooling means enables the bottom electrode to have a simple structure, since it is not necessary to consider an air passage as in the conventional air-cooling system. Thus, the contact pins can be arranged more freely than in the conventional system. Accordingly, the degree of freedom in the layout of the bottom electrode increases significantly, which enables a large number of contact pins to be employed in the bottom electrode without reducing the cooling effect, thereby considerably increasing the furnace capacity.

Moreover, since the furnace has a wide bottom, the protection refractory members can easily be attached thereto.

In addition, the current base plate can sufficiently be cooled, and hence the refractory members (a contact pin-protecting refractory member and a peripheral refractory member) are worn more slowly than those employed in the conventional furnace. As a result, the lives of the bottom refractory members can be elongated; the running cost of the refractory members be reduced; and the life of the bottom electrode be elongated.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A DC arc furnace for melting an object with the use of the heat of arc generated between a bottom electrode and an upper electrode, the bottom electrode comprising:

a plurality of contact pins each contact pin having an end to be brought into contact with the object and to supply an arc-forming current thereto, wherein the number of said plurality of contact pins falls within a range of 200–300;

a current base electrically connected to another end of each of the contact pins for distributing current from a power supply to the contact pins;

a coolant passage attached to the current base for performing heat exchange with the current base for cooling the current base;

a coolant supply source for supplying said coolant passage with cooling water as a coolant; and an exhausting device for exhausting the cooling water in the coolant passage.

2. The DC arc furnace according to claim 1, wherein said plurality of contact pins are arranged on the current base in rows and columns substantially with a regular pitch.

3. The DC arc furnace according to claim 1, wherein said coolant passage is formed on a lower portion of the current base.

4. The DC arc furnace according to claim 1, further comprising:

temperature sensing means attached to a lower portion of the current base; and an alarming system for generating an alarm when the sensed temperature exceeds a set value.

5. The DC arc furnace according to claim 1, further comprising a solid terminal attached to a lower portion of the current base for supplying said plurality of contact pins with DC current.

6. The DC arc furnace according to claim 1, wherein the current base comprises a steel plate having a thickness of at least 90 mm.

7. The DC arc furnace according to claim 1, further comprising:

a monolithic refractory for protecting an essential portion of each of the contact pins; and wherein the current base is in contact with the monolithic refractory.

8. The DC arc furnace according to claim 7, wherein the monolithic refractory comprises particles made of magnesia carbon.

9. The DC arc furnace according to claim 1, wherein the upper electrode comprises a single graphite electrode bar.

10. A DC arc furnace for melting an object with the use of the heat of an arc generated between a bottom electrode and an upper electrode, the bottom electrode comprising:

a plurality of contact pins, each contact pin having an end to be brought into contact with the object and to supply arc-forming current thereto;

a current base electrically connected to another end of each of the contact pins for distributing current from a power supply to the contact pins, the current base comprising a steel plate having a thickness of at least 90 mm;

cooling means for cooling the current base; and a solid terminal attached to a lower portion of the current base for supplying said plurality of contact pins with DC current.

11. The DC arc furnace according to claim 10, wherein the number of said plurality of contact pins falls within a range of 200–300.

12. A DC arc furnace for melting an object with the use of the heat of an arc generated between a bottom electrode and an upper electrode, the bottom electrode comprising:

a plurality of contact pins, each contact pin having an end to be brought into contact with the object and to supply arc-forming current thereto;

a current base electrically connected to another end of each of the contact pins for distributing current from a power supply to the contact pins;

cooling means for cooling the current base; and wherein the current base comprises a steel plate having a thickness of at least 90 mm.

13. The DC arc furnace according to claim 12, wherein the number of said plurality of contact pins falls within a range of 200–300.

14. A DC arc furnace for melting an object with the use of the heat of an arc generated between a bottom electrode and an upper electrode, the bottom electrode comprising:

a plurality of contact pins, each contact pin having an end to be brought into contact with the object and to supply arc-forming current thereto;

a current base electrically connected to another end of each of the contact pins for distributing current from a power supply to the contact pins;

cooling means for cooling the current base;

wherein the number of said plurality of contact pins falls within a range of 200–300.

15. A DC arc furnace for melting an object with the use of the heat of an arc generated between a bottom electrode and an upper electrode, the bottom electrode comprising:

a plurality of contact pins, each contact pin having an end to be brought into contact with the object and to supply arc-forming current thereto, wherein the number of said plurality of contact pins falls within the range of 200–300;

a current base electrically connected to another end of each of the contact pins for distributing current from a power supply to the contact pins;

cooling means for cooling the current base; and a solid terminal attached to a lower portion of the current base for supplying said plurality of contact pins with DC current.

\* \* \* \* \*